(12) United States Patent
Hannet et al.

(10) Patent No.: US 10,830,331 B2
(45) Date of Patent: Nov. 10, 2020

(54) TRANSMISSION INCLUDING A FIRST HOUSING PART AND A SECOND HOUSING PART

(71) Applicant: SEW-EURODRIVE GMBH & CO. KG, Bruchsal (DE)

(72) Inventors: Stefan Hannet, Schwetzingen (DE); Markus Wöppermann, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 16/349,464

(22) PCT Filed: Oct. 25, 2017

(86) PCT No.: PCT/EP2017/025319
§ 371 (c)(1),
(2) Date: May 13, 2019

(87) PCT Pub. No.: WO2018/086758
PCT Pub. Date: May 17, 2018

(65) Prior Publication Data
US 2020/0191252 A1  Jun. 18, 2020

(30) Foreign Application Priority Data
Nov. 11, 2016 (DE) .................. 10 2016 013 396

(51) Int. Cl.
*F16H 57/02* (2012.01)
*F16H 1/28* (2006.01)

(52) U.S. Cl.
CPC ........... *F16H 57/02* (2013.01); *F16H 1/2827* (2013.01); *F16H 2057/02034* (2013.01)

(58) Field of Classification Search
CPC ...... F16H 1/2827; F16H 57/02; F16H 57/029; F16H 2057/02008; F16H 2057/02034
See application file for complete search history.

(56) References Cited

U.S. PATENT DOCUMENTS

| 2,842,006 | A | * | 7/1958 | Edman | ...................... F16D 1/06 74/434 |
| 3,887,290 | A | * | 6/1975 | Taylor | ..................... F16D 1/096 403/370 |
| 4,116,478 | A | | 9/1978 | Yamaji | |
| 7,290,806 | B2 | | 11/2007 | Pichel | |
| 8,231,298 | B2 | * | 7/2012 | Szentmihalyi | .......... F16D 1/116 403/1 |

(Continued)

FOREIGN PATENT DOCUMENTS

| DE | 1009638 | A | 6/1957 |
| DE | 2738453 | A1 | 3/1978 |

(Continued)

OTHER PUBLICATIONS https://web.archive.org/web/20150213233059/https://en.wikipedia.org/wiki/Knurling as published on Feb. 13, 2015. (Year: 2015).*

(Continued)

*Primary Examiner* — Adam D Rogers
(74) *Attorney, Agent, or Firm* — Carter, Deluca & Farrell LLP

(57) ABSTRACT

A transmission includes a first housing part and a second housing part connected at least by a friction-locked connection with the aid of a clamp ring.

15 Claims, 8 Drawing Sheets

(56) References Cited

U.S. PATENT DOCUMENTS

| | | | | |
|---|---|---|---|---|
| 8,919,214 | B2* | 12/2014 | Brooks | F16H 57/029 |
| | | | | 180/53.1 |
| 9,388,880 | B2* | 7/2016 | Shizu | F16H 1/28 |
| 9,956,870 | B2* | 5/2018 | Messink | B60K 17/046 |
| 10,364,853 | B2* | 7/2019 | Reimchen | F16D 41/066 |
| 2019/0360579 | A1* | 11/2019 | Hannet | F16H 1/2818 |

FOREIGN PATENT DOCUMENTS

| | | | | |
|---|---|---|---|---|
| DE | 4105995 | A1 | | 8/1992 |
| DE | 4116791 | A1 | | 11/1992 |
| DE | 29913996 | U1 | | 12/1999 |
| DE | 10159667 | A1 | | 6/2003 |
| DE | 102005049666 | A1 | | 4/2007 |
| DE | 102006043961 | A1 | | 4/2008 |
| DE | 102006062645 | A1 | | 6/2008 |
| DE | 102012111487 | A1 | | 5/2014 |
| DE | 104141771 | A | | 11/2014 |
| DE | 102013208290 | A1 * | 11/2014 | F16H 57/031 |
| DE | 102014221191 | A1 | | 4/2016 |
| DE | 102015003047 | A1 | | 9/2016 |
| DE | 102015221974 | A1 | | 5/2017 |
| EP | 0121021 | A1 | | 10/1984 |
| EP | 2565497 | A1 | | 3/2013 |

OTHER PUBLICATIONS

Machine translation of DE 4116791 A1 obtained on Mar. 27, 2020.*
Machine translation of DE 102012111487 A1 obtained on Mar. 27, 2020.*
Machine translation of DE 102006062645 A1 obtained on Mar. 27, 2020.*
International Preliminary Report on Patentability issued from the International Bureau dated May 23, 2019.
International Search Report dated Jan. 23, 2018, in International Application No. PCT/EP2017/025319 (English-language translation).
Roloff/Matek Maschinenelemente, Normung, Berechnung, Gestaltung, 19 überarbeitete and erweiterte Auflage, pp. 389-395.

* cited by examiner

TRANSMISSION INCLUDING A FIRST HOUSING PART AND A SECOND HOUSING PART

FIELD OF THE INVENTION

The present invention relates to a transmission that includes a first housing part and a second housing part.

BACKGROUND INFORMATION

It is generally known that a transmission has a housing.

SUMMARY

Example embodiments of the present invention provide a transmission having a first housing part and a second housing part.

According to an example embodiment of the present invention, a transmission includes a first housing part and a second housing part connected at least by friction locking with the aid of a clamp ring.

This has the advantage that a non-destructible, reusable connection is provided so that a multi-stage transmission is able to be assembled in a simple manner. This is because a first gear stage is able to be placed in the first housing part and a second gear stage may be placed in the second housing part. The friction-locked connection is implementable by expanding the clamp ring.

According to example embodiments, the clamp ring has a radially and/or axially uninterrupted slot at a circumferential position. This offers the advantage of allowing for an uncomplicated expansion.

According to example embodiments, the clamp ring has a conical surface by which the clamp ring rests against the first housing part in a planar manner. This offers the advantage that the clamp ring and the corresponding contact surface on the first housing part are readily produced. The cone angle of the conical surface may be selected so that the lowest possible friction is achievable.

According to example embodiments, the threaded section of a clamping screw is screwed into an axially aligned threaded bore of a clamping flange, so that the clamping flange is axially pulled in the direction of the first housing part and thus exerts pressure on the clamp ring, in particular such that it is expanded and preloaded and exerts pressure on the second housing part at its radial outer circumference in order to produce the friction-locked connection. This is considered advantageous insofar as axial pressure of the clamping flange may be induced in a simple manner by the clamping screw. Via its conical surface, the clamp ring is thus pressed against the conical surface that is correspondingly provided on the first housing part and is thereby radially expanded in this manner, so that the friction-locked connection to the second housing part is achieved.

According to example embodiments, the clamp ring has a cylindrical shape at its outer circumference. This is considered advantageous insofar as the expansion causes a radial contact pressure, and a large pressure surface, i.e., contact surface, is brought about between the clamp ring and the first housing part.

According to example embodiments, a screw head of the clamping screw rests against the side of a bearing flange facing away from the first housing part, the clamping screw being inserted through an axially uninterrupted bore through the bearing flange and through the first housing part. This makes it possible to implement an axial pressure.

According to example embodiments, the first housing part is situated axially between the clamping flange and the bearing flange. This offers the advantage that the clamping flange is able to be pulled in the direction of the bearing flange with the aid of the clamping screw, the clamping flange exerting pressure on the clamp ring, which in turn exerts pressure on the first housing part, which is braced on the bearing flange. This causes a radial expansion of the clamp ring, which is also situated between the clamping flange and the bearing flange, on the conical contact surface provided on the first housing part so that the clamp ring exerts pressure on a receiving surface on the second housing part and thereby brings about a friction-locked connection. In other words, a small clearance, in particular a gap, is thus present between the clamping flange and the first housing part.

According to example embodiments, the radial wall thickness of the clamp ring decreases in the direction of the first housing part. This is considered advantageous insofar as it allows for a simple arrangement as a conical surface.

According to example embodiments, the radial wall thickness of the clamp ring decreases in the direction of the clamping flange, the clamping flange in particular having a corresponding conical surface for the planar contact between the clamp ring and the clamping flange. This is considered advantageous insofar as it makes for an uncomplicated production of the conical surface.

According to example embodiments, the radial wall thickness has a maximum which is either located at an axial edge of the clamp ring or is set apart from the two axial edges of the clamp ring. This is considered advantageous insofar as a conical surface may be provided on the clamp ring on both sides, in particular a first conical surface as well as a second conical surface which is axially set apart therefrom or abuts it.

According to example embodiments, a bearing of a rotor shaft of an electric motor which is driving the transmission is accommodated in the bearing flange. This offers the advantage that it is possible to produce a geared motor having a multi-stage transmission.

According to example embodiments, the first housing part is arranged as an internal ring gear of a first planet gear stage of the transmission. This offers the advantage that a multi-stage transmission is possible to produce by placing a first stage in the first housing part, and a further housing part is connectable to this first housing part. This may either be a flange on the output side or a second housing part, which includes a further gear stage.

According to example embodiments, the second housing part is arranged as an internal ring gear of a second planet gear stage of the transmission. This offers the advantage that a second stage is connectable to the first stage by plugging the two housing parts together and then establishing a friction-locked connection.

According to example embodiments, an annular groove is provided on the second housing part, the axial region covered by the annular groove encompassing the axial region covered by the clamp ring. This is considered advantageous insofar as, in addition to the friction-locked connection, it is possible to produce a keyed connection in the axial direction.

According to example embodiments, the clamp ring is preloaded and/or expanded to such an extent that the clamp ring projects at least partially into the annular groove. This has the advantage of providing an uncomplicated keyed connection.

According to example embodiments, the tooth system of the first housing part arranged as an internal ring gear meshes with the tooth system of a planet gear, which also meshes with the tooth system of a sun gear, which is connected to the rotor shaft of the electric motor driving the transmission in a torsionally fixed manner, the planet gear being rotatably mounted on a planet gear axle, which is pressed into a planet gear carrier. This is considered advantageous insofar as the arrangements described herein may be used in a multi-stage planet gear.

According to example embodiments, a further sun gear is connected to the planet gear carrier in a torsionally fixed manner, the tooth system of a further planet gear meshing with the tooth system of the sun gear, the tooth system of the further planet gear also meshing with the tooth system of the second housing part, which is arranged as an internal ring gear, the further planet gear being rotatably mounted on a planet gear axle, which is pressed into a planet gear carrier functioning as the output shaft of the transmission. This has the advantage that the arrangements described herein may be used in a multi-stage planet gear.

According to example embodiments, the clamp ring has a grooved, knurled and/or toothed configuration on its radial outer circumference facing the second housing part. This is considered advantageous insofar as the connection is able to be further improved, thereby achieving a rotation restriction, in particular.

Further features and aspects of example embodiments of the present invention are will now be described in greater detail below with reference to the appended Figures.

DETAILED DESCRIPTION

Figure 1:
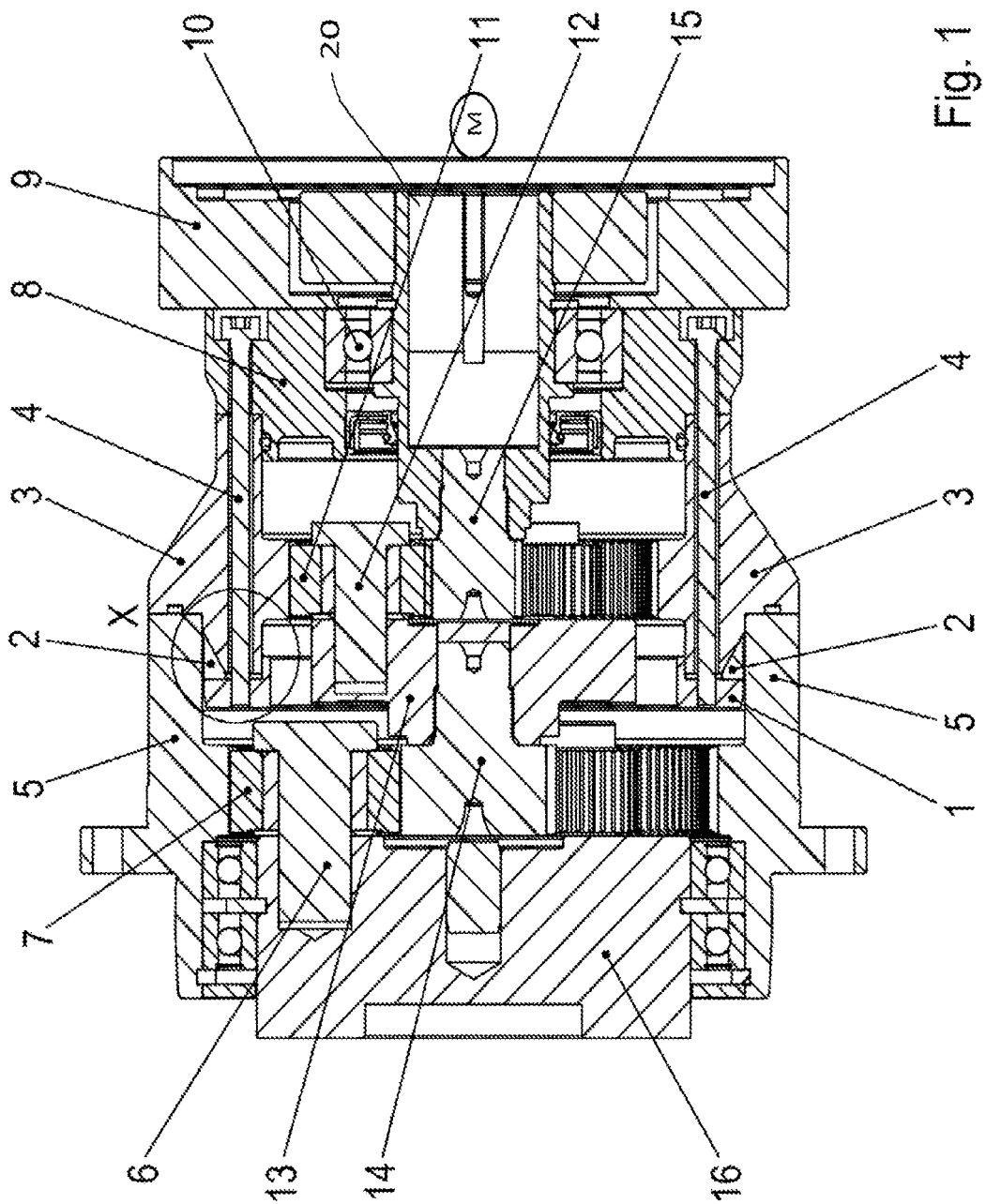
FIG. 1 shows a cutaway of a first geared motor according to an example embodiment of the present invention, a clamp ring being provided for the friction-locked connection of two housing parts (3, 5).
Figure 2:
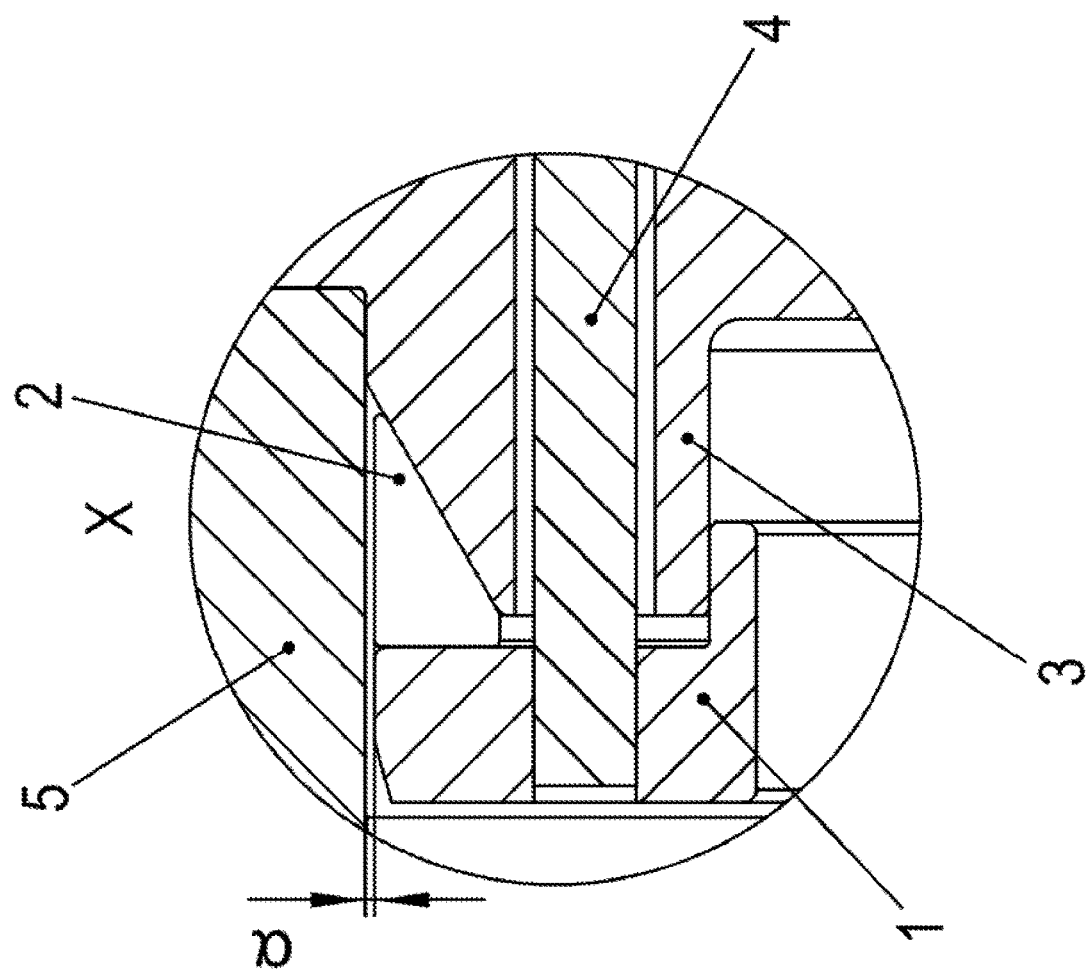
FIG. 2 shows an enlarged view of a region from FIG. 1.
Figure 3:
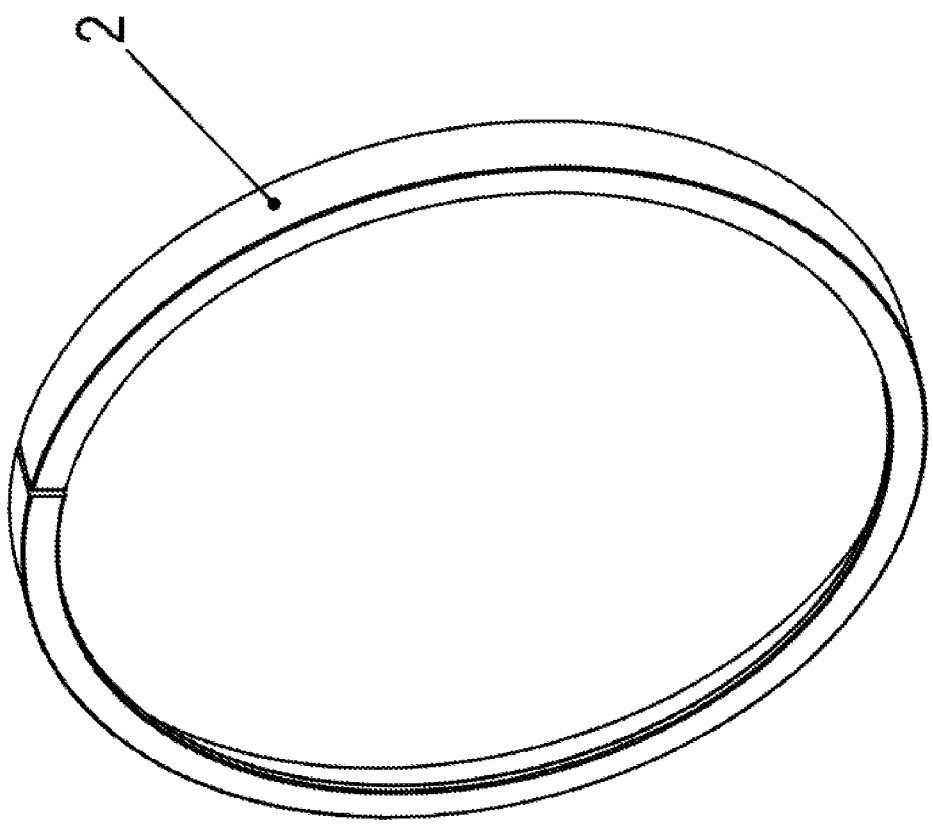
FIG. 3 shows clamp ring 2 in an oblique view.

As illustrated in FIG. 1 in conjunction with FIG. 2 and FIG. 3, a clamp ring 2 is used when connecting housing parts (3, 5).

The geared motor has an electric motor M to whose motor housing 9 a bearing flange 8 is firmly connected, in particular with the aid of screws. A bearing 10, which rotatably supports the rotor shaft 20 of the electric motor M relative to bearing flange 8, is accommodated in bearing flange 8.

The rotor shaft is connected in a torsionally fixed manner to a sun gear 15, which acts as an input-side toothed part of the transmission.

The transmission is arranged as a planet gear, for example.

The tooth system of sun gear 15 meshes with the tooth system of a planet gear 11, which is rotatably supported on a planet gear axle 12 with the aid of a bearing, in particular a needle bearing.

In addition, the tooth system of planet gear 7 meshes with the tooth system of an internal ring gear, which is arranged as first housing part 3.

Planet gear axle 12 is pressed into a planet gear carrier 13, in particular into a side provided in a planet gear carrier 13.

Planet gear carrier 13 is therefore arranged as an output shaft of the first planet gear stage and is connected in a torsionally fixed manner to a sun gear 14 of a second planet gear stage. Sun gear 14 may be pressed into planet gear carrier 13.

The tooth system of sun gear 14 meshes with the tooth system of a planet gear 7, which is rotatably mounted on a planet gear axle that is connected by being pressed into planet gear carrier 16, which represents the output shaft, the support being accomplished via bearings, in particular needle bearings.

In addition, the tooth system of planet gear 7 meshes with the tooth system of a further internal ring gear, which is arranged as second housing part 5.

First housing part 3 is frictionally connected to second housing part 5 in that a clamp ring 2 is provided with a slanted surface, i.e. a bevel, or in other words, a conical surface that rests against a corresponding conical surface of first housing part 3.

With the aid of an axially oriented clamping screw 4, clamp ring 2 is axially pressed in the direction of first housing part 3. Toward this end, a threaded region of clamping screw 4 is screwed into an axially aligned threaded bore introduced into a clamping flange 1. The screw head of clamping screw 4 situated on the axially opposite end region thus presses bearing flange 8 in the direction of first housing part 3 on its side facing away from first housing part 3. However, since first housing part 3 and bearing flange 8 are resting against each other, clamp ring 2 is subjected to axial pressure by clamping flange 1 resting against it on its side facing away from first housing part 3, and clamp ring 2 is thereby radially expanded on the conical surface provided on first housing part 3, so that the clamp ring presses against second housing part 5.

It should be noted in this context that the axial region covered by clamp ring 2 overlaps with the axial region covered by second housing part 5. As a result, clamp ring 2 rests across its entire radial circumference against second housing part 5, which for this purpose has a cylindrical receiving surface in this region.

The axial region covered by first housing part 3 overlaps with the region covered by second housing part 5. Clamp ring 2 may thus be situated radially between the two housing parts (3, 5). Pressing clamp ring 2 axially onto the conical surface of first housing part 3 causes a radial expansion of clamp ring 2 and thus a friction-locked connection between the first and second housing part (3, 5) with the aid of clamp ring 2.

Clamping screw 4 is situated at a smaller radial clearance with respect to the axis of rotation of the input shaft, and thus also with respect to the axis of rotation of sun gear 15, than clamp ring 2, and thus in particular also the inner surface of clamp ring 2.

On the one hand, the radial clearance region covered by clamping flange 1 overlaps with the radial clearance region covered by clamp ring 2, and on the other hand, it overlaps with the radial clearance region covered by clamping screw 4.

First housing part 3 is inserted into the receiving opening provided on second housing part 5. A step provided on first housing part 3 serves as an axial restriction.

Second housing part 5 is not just the internal ring gear of the second gear stage, but also covers the axial region covered by the second gear stage.

In the same manner, first housing part 3 is not just arranged as an internal ring gear but also covers the axial region covered by the first gear stage.

As illustrated in FIGS. 2 and 3, the ring axis of clamp ring 3 is aligned in the axial direction.

The radial wall thickness of the ring decreases in the axial direction, that is to say, from second housing part 5 in the direction of the motor, in particular in the direction of bearing flange 8 of the motor, because the inner surface of clamp ring 2 is arranged as a conical surface and the outer surface is provided in cylindrical form, i.e. with a constant radius.

Clamp ring 2 has a radially and axially uninterrupted slot at a circumferential position so that the expansion is able to be accomplished in a particularly uncomplicated manner.

Planet gear carrier 16 is rotatably mounted via bearings accommodated in a second housing part 5 and functions as the output shaft of the transmission.

Figure 4:
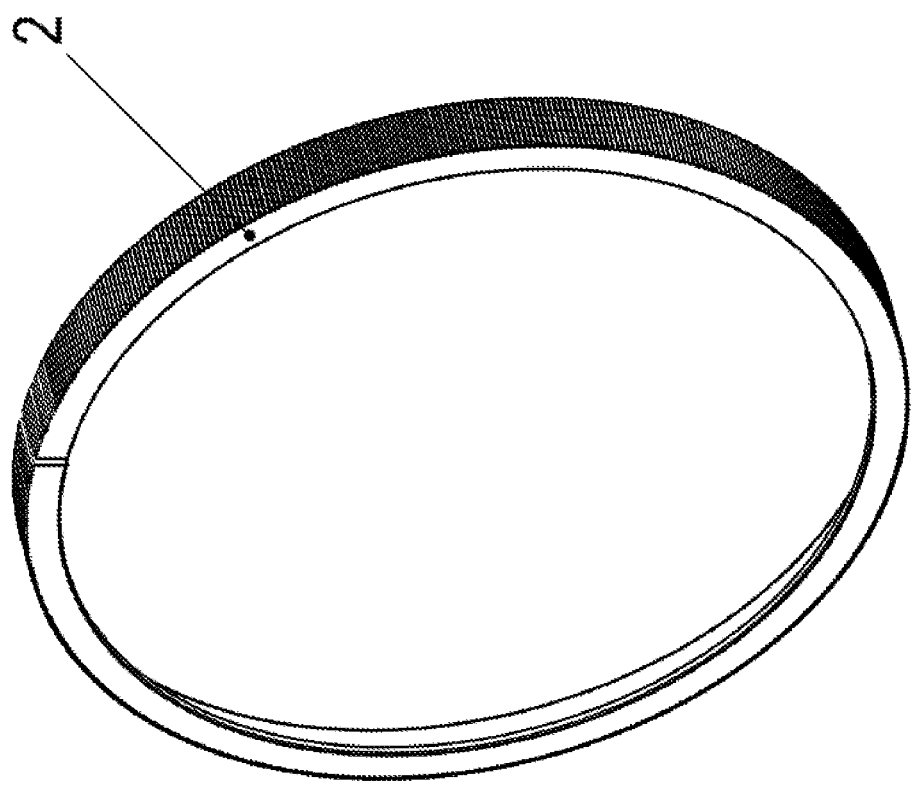
FIG. 4 shows an oblique view of a clamp ring 2, which may be used as an alternative in FIG. 1.

As illustrated in FIG. 4, grooves or knurls or a tooth system may also be provided on the outer circumference of clamp ring 2, so that a better connection to second housing part 5 is achievable.

Figure 5:
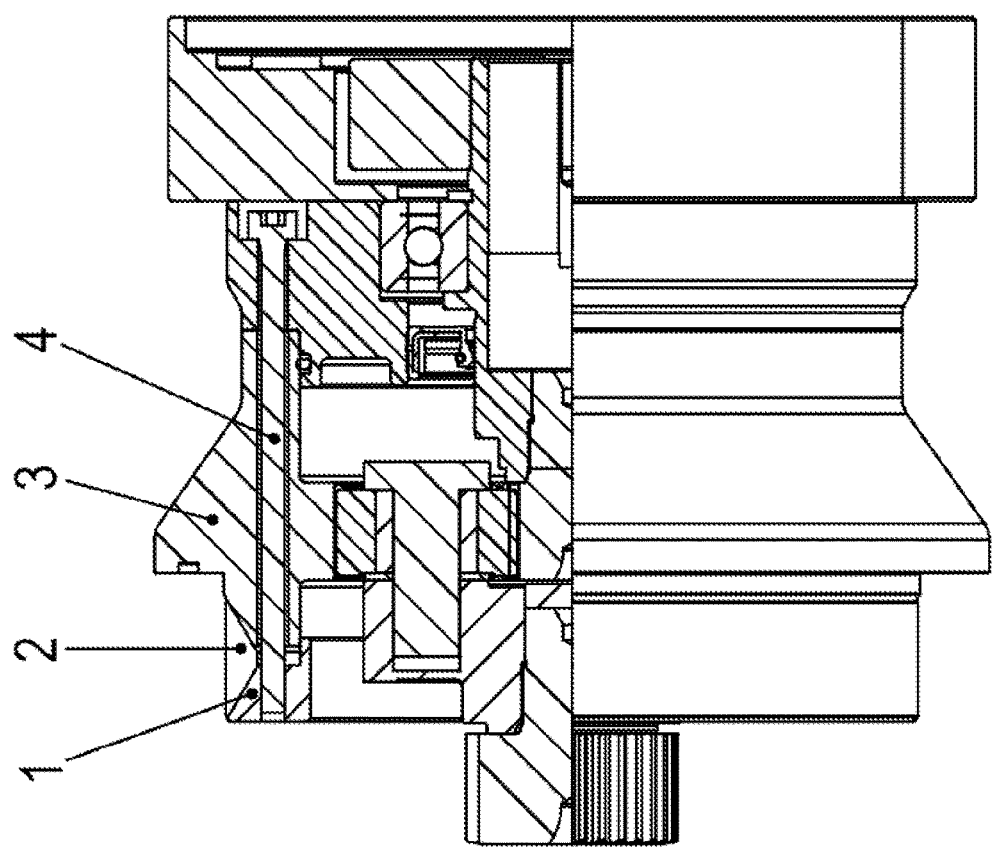
FIG. 5 shows a cutaway of another geared motor according to an example embodiment of the present invention, in which a clamp ring 2 having a different configuration is used.
Figure 6:
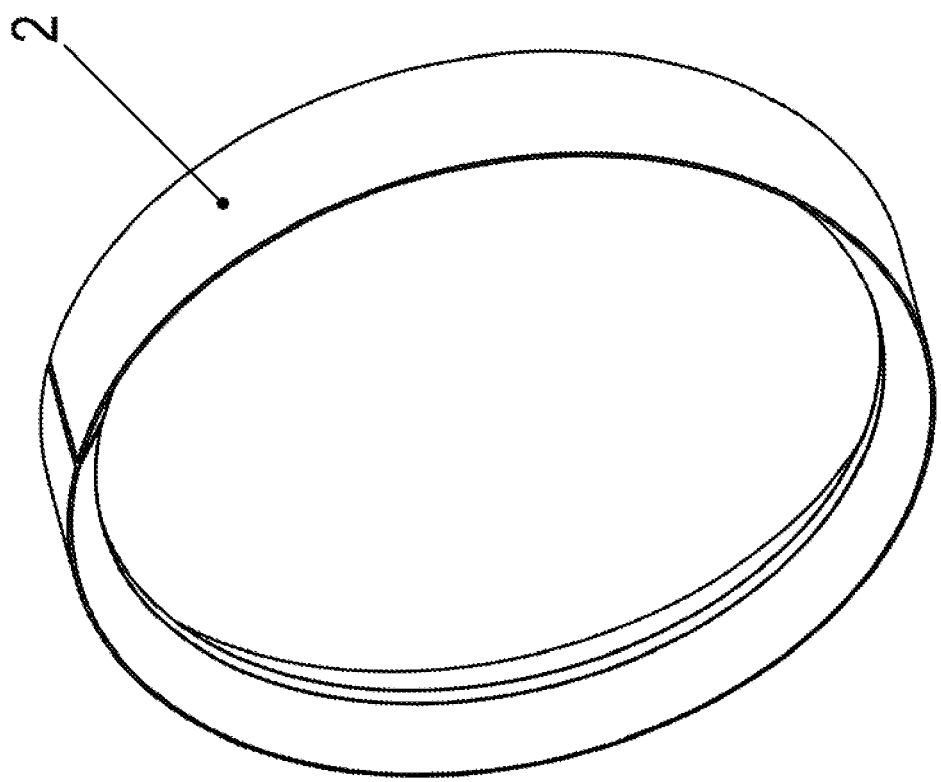
FIG. 6 shows a clamp ring 2 associated with FIG. 5, which has two bevels.

However, as shown in FIG. 6 and FIG. 5, another clamp ring 2 which has a conical surface axially on both sides may be used as an alternative. The radially outer surface, similar to FIG. 3, is arranged as a cylindrical surface. However, the radial wall thickness initially increases in the axial direction, in particular in proportion to the axial clearance from the axial edge, and then decreases again, in particular also in proportion to the axial clearance from the other axial edge of clamp ring 2.

A first conical surface is therefore provided on clamp ring 2, which is facing in the direction of clamping flange 1, and a second conical surface is provided on clamp ring 2, which is facing in the direction of first housing part 3.

The tip of the first conical surface points in the opposite direction from the tip of the second conical surface. The radial wall thickness thus increases in the axial direction until a maximum value has been reached, and then it decreases again.

A conical surface that corresponds to the first conical surface is provided on clamping flange 1, so that clamp ring 2 rests against clamping flange 1 in a planar manner via its first conical surface. In the same manner, a conical surface that corresponds to the second conical surface is provided on first housing part 3, so that clamp ring 2 rests against first housing part 3 in a planar manner.

When clamping screw 4 is tightened, an expansion of clamp ring 2 is therefore produced again in order to establish the friction-locked connection to second housing part 5; however, due to the axially bilateral placement of conical surfaces, a lower friction is able to be induced and a less complicated expansion is achievable.

Figure 7:
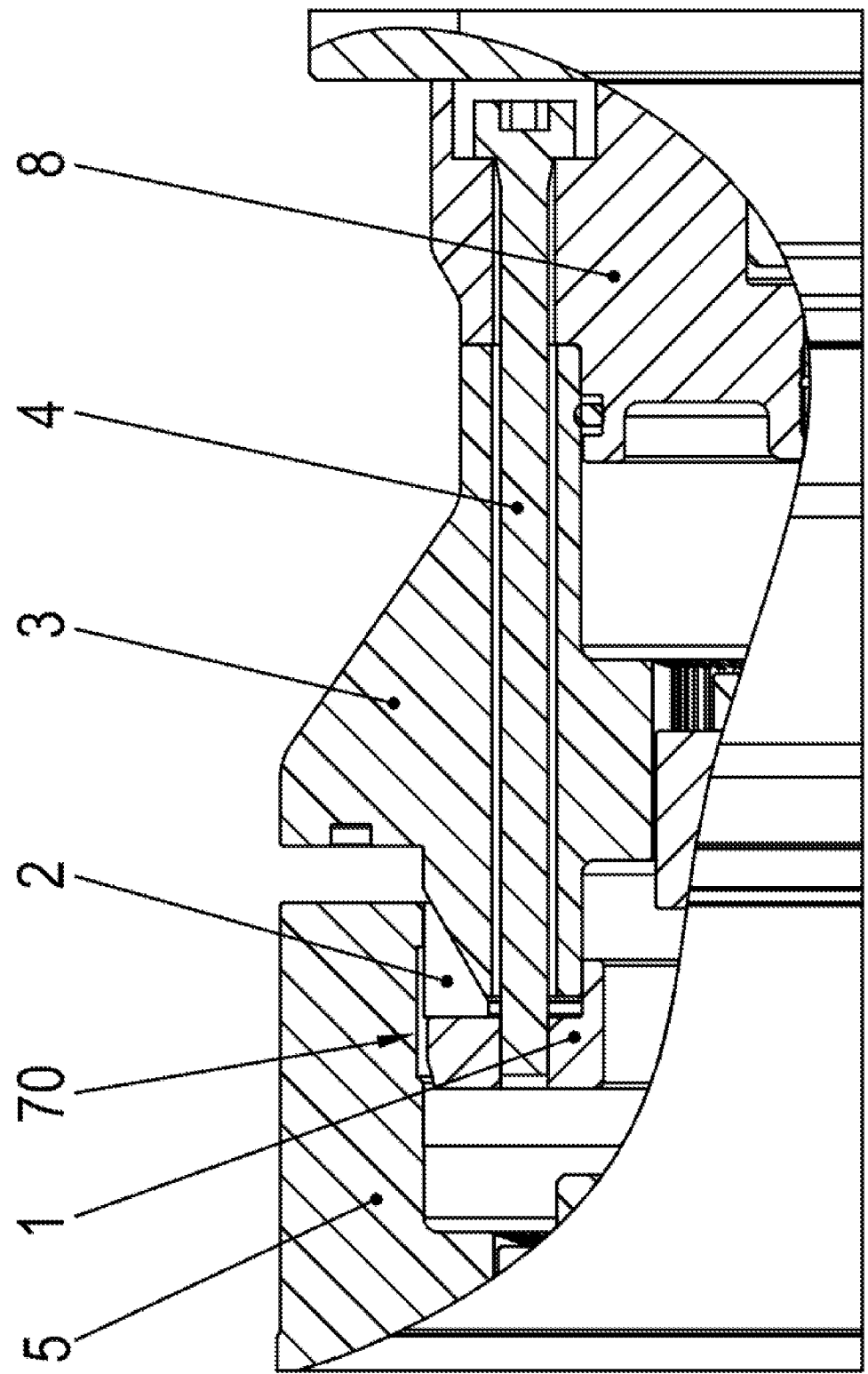
FIG. 7 shows a cutaway of another geared motor according to an example embodiment of the present invention, in which clamp ring 2 is shown prior to the insertion into an annular groove 70 introduced into second housing part 5.
Figure 8:
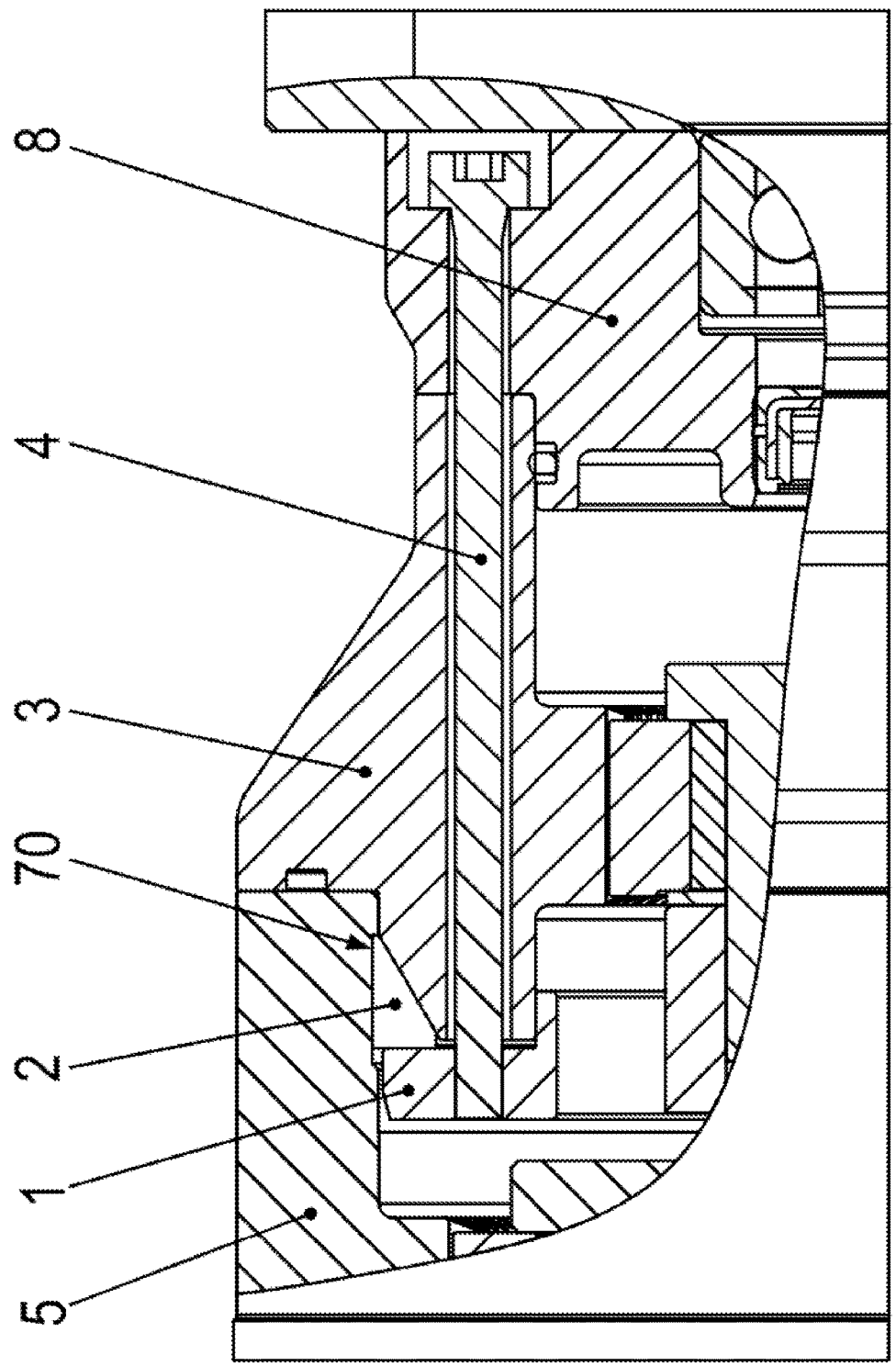
In FIG. 8, in contrast to FIG. 7, clamp ring 2 is axially inserted to such an extent that it is able to project at least partially into the annular groove.

As illustrated in FIG. 7 and FIG. 8, an annular groove, into which clamp ring 2 is pressed during the expansion, may additionally be provided on second housing part 5.

Toward this end, the axial region covered by clamp ring 2 is encompassed by the axial region covered by the annular groove, as illustrated in FIG. 8. FIG. 7 shows the state in which first housing part 3 is plugged into second housing part 5, the axial region covered by clamp ring 2 not yet being completely covered by the axial region covered by annular groove 70.

The clamp ring is arranged according to FIG. 3 in this instance.

In further exemplary embodiments, clamp ring 2 may be arranged according to the embodiment of FIG. 7 and FIG. 8 or else also as a clamp ring 2 according to FIG. 4 or according to FIG. 6.

In addition to the keyed connection produced in the axial direction, annular groove 70 makes it possible to establish a keyed connection.

A seal, in particular a flat seal or O-ring, is provided between the first and second housing parts (3, 5). The seal is situated at a greater radial clearance than annular groove 70.

In additional exemplary embodiments, only the first or the second conical surface is developed on clamp ring 2. Accordingly, the clamping flange then either includes or does not include a conical surface.

LIST OF REFERENCE CHARACTERS

1 clamping flange
2 clamp ring
3 first housing part, in particular an internal ring gear
4 screw
5 second housing part, in particular an internal ring gear
6 planet gear axle
7 planet gear
8 bearing flange
9 motor housing, in particular stator housing
10 bearing
11 planet gear
12 planet gear axle
13 planet gear carrier
14 sun gear
15 sun gear
16 planet gear carrier
20 rotor shaft
70 annular groove
M electric motor

The invention claimed is:

1. A transmission, comprising:
   a first housing part;
   a second housing part; and
   a clamp ring at least frictionally connecting the first housing part and the second housing part;
   wherein a threaded section of a clamping screw is screwed into an axially aligned threaded bore of a clamping flange, so that the clamping flange is axially pulled in a direction of the first housing part and thereby exerts pressure on the clamp ring, so that the clamp ring is expanded and preloaded and presses against the second housing part at a radial outer circumference in order to establish a friction-locked connection.

2. The transmission according to claim 1, wherein the clamp ring includes a radially and/or axially uninterrupted slot at a circumferential position.

3. The transmission according to claim 1, wherein the clamp ring includes a conical surface by which the clamp ring rests against the first housing part in a planar manner.

4. The transmission according to claim 1, wherein the clamp ring has a cylindrical form at an outer circumference.

5. The transmission according to claim 1, wherein a screw head of the clamping screw rests against a side of a bearing flange that faces away from the first housing part, the clamping screw being arranged through an axially uninterrupted bore through the bearing flange and through the first housing part.

6. The transmission according to claim 5, wherein the first housing part is arranged axially between the clamping flange and the bearing flange.

7. The transmission according to claim 5, wherein a bearing of a rotor shaft of an electric motor adapted to drive the transmission is accommodated in the bearing flange.

8. The transmission according to claim 1, wherein a radial wall thickness of the clamp ring decreases in a direction of the first housing part.

9. The transmission according to claim 8, wherein the radial wall thickness has a maximum located either at an axial edge of the clamp ring or is set apart from two axial edges of the clamp ring.

10. The transmission according to claim 1, wherein a radial wall thickness of the clamp ring decreases in a direction of the clamping flange, the clamping flange having a corresponding conical surface for a planar contact of the clamp ring with the clamping flange.

11. The transmission according to claim 1, wherein the first housing part is formed as an internal ring gear of a first planet gear stage of the transmission and/or the second housing part is formed as an internal ring gear of a second planet gear stage of the transmission.

12. The transmission according to claim 1, wherein an annular groove is provided on the second housing part, and an axial region covered by the annular groove encompasses an axial region covered by the clamp ring.

13. The transmission according to claim 12, wherein the clamp ring is preloaded and/or expanded such that the clamp ring projects at least partially into the annular groove.

14. The transmission according to claim 11, wherein the clamp ring has a grooved, knurled, and/or toothed configuration on a radial outer circumference facing the second housing part.

15. A transmission, comprising:
a first housing part;
a second housing part; and
a clamp ring at least frictionally connecting the first housing part and the second housing part;
wherein a tooth system of the first housing part is formed as an internal ring gear meshes with a tooth system of a planet gear, which also meshes with a tooth system of a sun gear, which is connected in a torsionally fixed manner to a rotor shaft of an electric motor adapted to drive the transmission, the planet gear being mounted in a rotatable manner on a planet gear axle, which is pressed into a planet gear carrier, and/or a further sun gear is connected to the planet gear carrier in a torsionally fixed manner, a tooth system of a further planet gear meshing with a tooth system of the sun gear, the tooth system of the further planet gear also meshing with a tooth system of the second housing part, which is formed as an internal ring gear, the further planet gear being rotatably mounted on a planet gear axle, which is pressed into a planet gear carrier arranged as an output shaft of the transmission.

* * * * *